(12) United States Patent
Monnett

(10) Patent No.: US 6,791,821 B1
(45) Date of Patent: Sep. 14, 2004

(54) TANTALUM-CARBON HYBRID CAPACITOR WITH ACTIVATED CARBON

(75) Inventor: Mark T. Monnett, Cloverdale, IN (US)

(73) Assignee: Yosemite Investment, Inc., Indianapolis, IN (US)

( * ) Notice: Subject to any disclaimer, the term of this patent is extended or adjusted under 35 U.S.C. 154(b) by 340 days.

(21) Appl. No.: 09/981,338

(22) Filed: Oct. 16, 2001

(51) Int. Cl.⁷ .............................................. H01G 9/045
(52) U.S. Cl. ...................... 361/509; 361/502; 361/504; 361/508; 361/516; 361/523; 361/525
(58) Field of Search ................................. 361/509, 508, 361/502, 504, 516, 520, 523, 525, 528, 433, 503, 533, 535, 511, 512, 517, 518, 529; 29/25.03

(56) References Cited

U.S. PATENT DOCUMENTS

| 4,523,255 A | * | 6/1985 | Rogers ........................ 361/516 |
| 4,780,797 A | | 10/1988 | Libby |
| 4,942,500 A | | 7/1990 | Libby et al. |
| 5,098,485 A | | 3/1992 | Evans |
| 5,469,325 A | | 11/1995 | Evans |
| 5,469,547 A | | 11/1995 | Pawlowski |
| 5,559,677 A | | 9/1996 | Errichiello |
| 5,737,181 A | | 4/1998 | Evans |
| 5,777,840 A | * | 7/1998 | Oney ........................ 361/519 |
| 5,982,609 A | | 11/1999 | Evans |

* cited by examiner

Primary Examiner—Dean A. Reichard
Assistant Examiner—Nguyen T. Ha
(74) Attorney, Agent, or Firm—McKee, Voorhees & Sease, P.L.C.

(57) ABSTRACT

An improved tantalum-carbon capacitor employs activated carbon in place of expensive metals to achieve a large surface area, and therefore higher capacitance, but at substantially lower cost than can be achieved using expensive metals to increase surface area. The capacitor includes a tantalum case, a tantalum anode, a dielectric layer on the anode, an electrolyte in contact with the dielectric layer on the anode, a layer of tantalum carbide on an inner surface of the case, and a layer of activated carbon between the layer of tantalum carbide and the electrolyte.

9 Claims, 1 Drawing Sheet

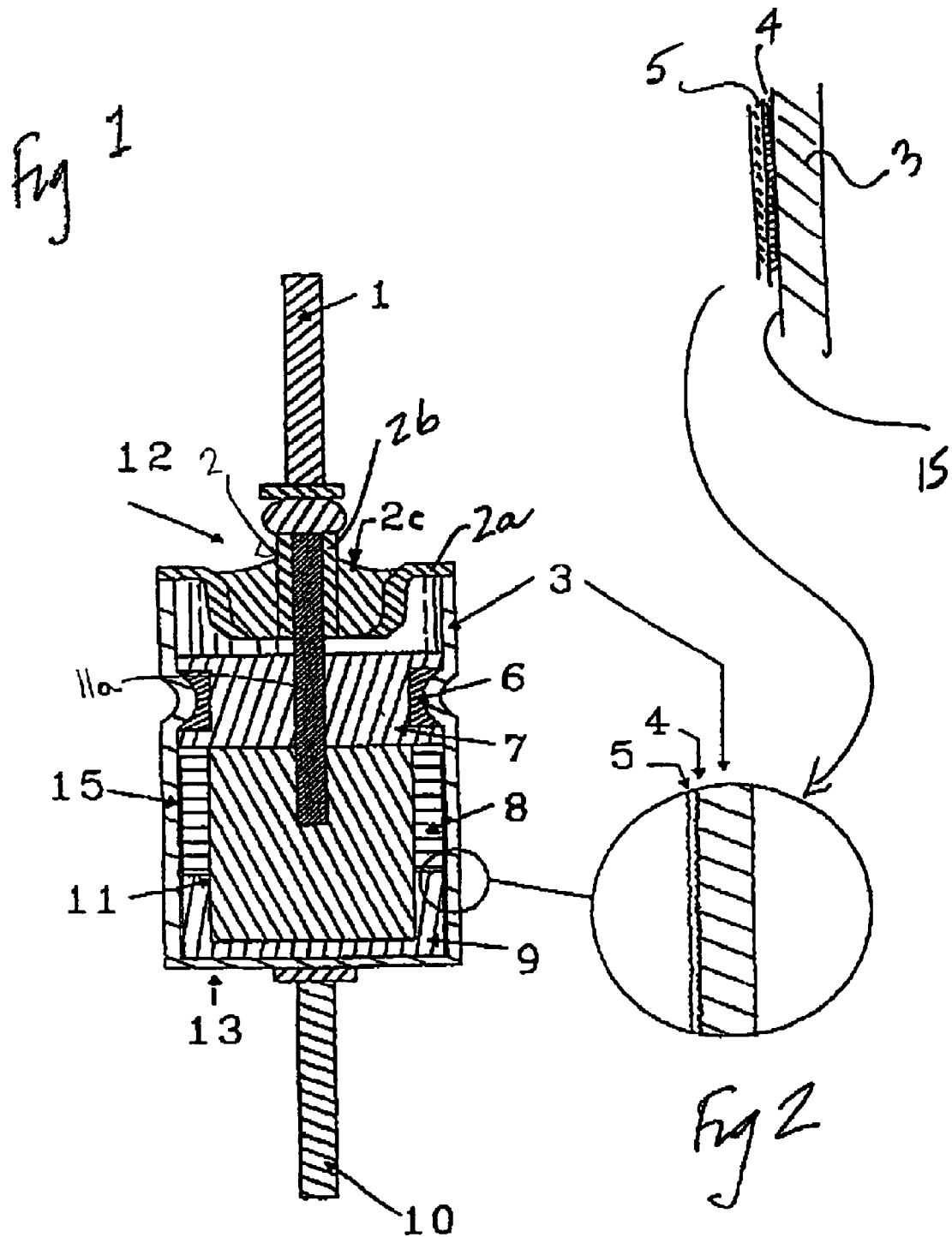

TANTALUM-CARBON HYBRID CAPACITOR WITH ACTIVATED CARBON

FIELD OF THE INVENTION

The present invention relates to an improved tantalum-carbon hybrid capacitor.

BACKGROUND OF THE INVENTION

A capacitor is typically made of two parallel surfaces or plates, each of which is an electrode. The electrodes are separated by a dielectric, that is, an insulating material. The dielectric may be a gas, liquid, solid, or vacuum. The capacitance is directly proportional to the surface area of the electrodes and inversely proportional to the thickness of the dielectric.

An electrolytic capacitor consists of a series combination of two conductors (e.g., foil electrodes or plates) at least one of which is a valve metal. A dielectric film is formed adjacent to the surface of one or both of the electrodes. The dielectric is an oxide that has a high dielectric constant and a high dielectric strength: it is electrochemically deposited in very thin layers, and its thickness is usually on the order of hundreds to tens of thousands of Angstroms (Å).

An electrolytic capacitor uses an ionically conductive chemical compound or "electrolyte," in between its electrodes (i.e., metallic surfaces of plates). The electrolyte provides a large area for ionic charges to collect near the dielectric layer of the electrode(s), thereby greatly increasing the capacitance or the ability to store energy as electrostatic charges. The high volumetric efficiency of an electrolytic capacitor is due to its enhanced plate surface area and a very thin dielectric layer.

Electrolytic capacitors may be either "dry," or "wet." A dry electrolytic capacitor uses non-aqueous electrolyte that has very low water content. A dry electrolytic capacitor employs a separator between the electrodes: the separator is saturated wit the electrolyte.

A wet electrolytic capacitor uses a liquid or aqueous electrolyte, and therefore employs a liquid-tight container. An anode is submerged in the electrolyte inside the container. Although anode and cathode foils could be rolled together with a separator and submerged in the electrolyte, the container is normally attached to and therefore part of the cathode and a discrete anode is submerged in the electrolyte.

Tantalum-carbon wet electrolytic capacitors are useful in a number of applications, for example, as filters, for energy storage, for low source impedance circuits, for high charging-current circuits, for switching regulators supplies, and for other purposes.

SUMMARY OF THE INVENTION

Tantalum-carbon capacitors provide higher volumetric efficiency than pure wet tantalum-capacitors. The latter type of capacitor has a tantalum oxide anode and a tantalum oxide cathode. The higher efficiency of a tantalum-carbon capacitor is achieved by making the cathode out of a thin material with a high surface area. By doing so, a larger anode may be used in the same case size. The inner surface of similar capacitors have formerly been coated with a porous oxide of a metal such as platinum, ruthenium, iridium, nickel, rhodium, platinum, palladium, or osmium. See, for example, U.S. Pat. Nos. 5,982,609, 5,737,181, 5,559,677, 5,469,325, 5,469,547, 5,098,485, 4,942,500, and 4,780,797. The coating increases the available surface area, and therefore the capacitance. Such metals provide large surface area because of their small particle size and physical structure, and provide good conductivity. However, their cost is very high.

In the invention, activated carbon is used in place of the metals mentioned above. Activated carbon provides extremely high surface area and good conductivity. High capacitance is achieved, but without the cost associated with the use of platinum or other similar metals.

BRIEF DESCRIPTION OF THE FIGURES

FIG. 1 shows a side cross-section of a preferred embodiment of the present invention.

FIG. 2 is an enlarged cross-section of a portion of the wall of the present invention.

DETAILED DESCRIPTION

A capacitor 12 is shown in Figure in a side cross-sectional view. Capacitor 12 has a case 3 made of tantalum. A liquid or gel electrolyte 8 is inside the case 3. The presently preferred electrolyte is 38% sulfuric acid, but in some capacitors a gelling agent; such as sodium silicate, is used to make a gel electrolyte. The tantalum material of case 3, would normally attempt to passivate itself (that is, form an oxide layer) by combining with oxygen from electrolyte 8.

Now refer to FIG. 2. To prevent passivation, graphite is applied to the inner surface 15 of case 3. Case 3 then is heated to a temperature range of from; 1,000° C. to 1,500° C., which causes the formation of an interface layer 4 of tantalum carbide on wall 15 of case 3. The heating must occur in the absence of oxygen, such as in a vacuum or an atmosphere of inert gas, or both. The interface layer 4 of tantalum carbide prevents the tantalum case 3 from passivating.

At the same time, however, layer 4 maintains high conductivity, and provides a good surface-to-surface bond with a layer of activated carbon 5, which is used to provide a large surface area for good electrical contact with an electrolyte 8. Activated carbon 5 can be activated before application of carbon layer 5 or subsequent to application by thermal or chemical activation of a carbon-based precursor.

A binder is used to achieve good adherence of the activated carbon 5 to the layer of tantalum carbide 4. The binder also improves the cohesion of the activated carbon 5. Suitable polymeric matrixes or binders could include, but are not limited to: acrylics (i.e. acrylic, acrylic acid, methyl acrylate, ethyl acrylate); vinyls (i.e. vinyl, polyvinyl chloride, polyvinyl formal, polyvinyl butyral, polyvinyl acetate); fluoroelastomers, 2-methloxyethanol, 2-methoxyethyl acetate, methyl cellulose, hydroxyethyl cellulose, hydroxypropyl cellulose, cellulose with carboxyl proton substituted with alkali metal ion, i.e. aluminum for sodium, and cellulose with carboxyl proton substituted with ammonium. The preferred concentration of binder is 0.1 to 50.0%, and more preferably 1.0 to 5.0% by weight of the composition. The binders may also serve as thickening agents. Other binders known to persons of skill in the art may also be used.

The graphite and activated carbon can be dispersed in solvents or mixtures. Some usable solvents are water, and most types of alcohol or alcohol-like substances including but not limited to: methyl ethyl ketone, methyl isobutyl ketone, n-methyl-2-pyrrofidone, mesityl oxide, n-propanol, isopropyl alcohol, acetone, and ethanol. Other solvents known to persons of skill in the art may be used.

Capacitor 12 has a porous tantalum anode 11 and a riser 11a, which have been anodized under galvanically controlled conditions until a suitable potential is reached to meet capacitative, direct current leakage, and operational parameters. Anode 11 is mechanically held by an insulating bottom cup 9 and an insulating gasket 7 that has an elastomer seal 6. The liquid or gel inorganic electrolyte 8 is placed in between the anode 11 and case 3. The oxide on anode 11 serves as the dielectric. Riser 11a extends through a header 2 which is attached to and hermetically seals the top of case 3. The header 2 is comprised of a tantalum shell 2a, a tantalum tube 2b, and glass 2c. The preferred method of attachment is by welding the header 2 to the case 3 with a laser in the absence of oxygen. Electrical connections may then be made by lead wires, not shown, connected to a positive lead 1 and to a negative lead 10.

EXAMPLE 1

A group of cathodes was built by applying a graphite/alcohol solution to tantalum cases, which were then dried. The cases were heated in an atmosphere of argon and cooled in helium. An aqueous activated carbon colloid solution was applied and dried. The cases were filled with 38% sulfuric acid and tantalum pentoxide anodes were inserted. The units were measured with an impedance bridge and the average cathode capacitance was calculated to be 263.947 millifarads, using the formula. $C_c=1/(1/C_T-1/C_A)$. $C_c$ is cathode capacitance, $C_T$ is the total capacitance, and $C_A$ is the anode capacitance. Capacitors were assembled using anodes with a target capacitance of 680 microfarads with a rated direct current working voltage of fifty volts. The total capacitance is determined by the formula $C_T$ $1/(1/C_A+1/C_C)$ where: $C'_T$ is the total capacitance, $C_A$ is the anode capacitance, and Cc is the cathode capacitance. The total capacitance average was 685.79 microfarads. This higher case capacitance from a thin cathode allows more room for cathode capacitance and does not appreciably reduce the total capacitance.

EXAMPLE 2

A group of cathodes was built by applying a graphite/alcohol solution to tantalum cases, which then were dried. The cases were heated in an atmosphere of argon and cooled in helium. An aqueous activated carbon colloid solution was applied and dried. The cases were filled with 38% sulfuric acid and tantalum pentoxide anodes were inserted. The units were measured with an impedance bridge and the average cathode capacitance was calculated to be 88.033 millifarads. The formula $C_.=1(1/C_T-1/C_A)$ was used, where $C_c$ is cathode capacitance, $C_T$ is the total capacitance, and $C_A$ is the anode capacitance. Capacitors were assembled using anodes with a target capacitance of 680 microfarads with a rated direct current working voltage of twenty-five volts. The total capacitance is determined by the formula $C_T$ $1(1/C_A+1/C_c)$ where: $C_T$ is the total capacitance, $C_A$ is the anode capacitance, and $C_c$ is the cathode capacitance. The total capacitance was 688.5 microfarads. Again, the higher cathode capacitance did not appreciably reduce the total capacitance.

EXAMPLE 3

A group of cathodes was built by applying a graphite/alcohol solution to tantalum cases. The cases were dried. The cases were heated in a vacuum. An aqueous activated carbon colloid solution was applied and dried. The cases were filled with 38% sulfuric acid and tantalum pentoxide anodes were inserted. The units were measured with an impedance bridge and the average cathode capacitance was calculated to be 106.7 millifarads, using the formula $C_c=1/(1/C_T-1/C_A)$. Capacitors were assembled using anodes with a target capacitance of 220 microfarads with a rated direct current working voltage of 100 volts. The total capacitance is determined from the formula $C_T$ $1/(1/C_A+1/C_C$ 1. The total capacitance average was 228.26 microfarads. This higher case capacitance from a thin cathode allows more room for anode capacitance and does not appreciably reduce the total capacitance,

EXAMPLE 4

A group of cathodes was built by applying a graphite/alcohol solution to tantalum cases. The cases were dried. The cases were heated in a vacuum atmosphere. An aqueous activated carbon colloid solution was applied and dried. The cases were filled with 38% sulfuric acid and tantalum pentoxide anodes were inserted. The units were measured with an impedance bridge and the average cathode capacitance was calculated to be 106.7 millifarads, using the formula $C_c=1/(1/C_T-1/C_A)$.

Capacitors were assembled using anodes with a target capacitance of 150 microfarads with a rated direct current working voltage of 125 volts. The total capacitance is determined by the formula $C_T$ $1/(1/C_A+1/C_c)$. The total capacitance average was 156.26 microfarads. Again, the higher cathode capacitance did not appreciably reduce the total capacitance.

I claim:

1. An electrolytic capacitor comprising:
   a tantalum case;
   a tantalum anode;
   a dielectric layer on the anode;
   an electrolyte in contact with the dielectric layer on the anode;
   a layer of tantalum carbide on an inner surface of the case;
   a layer of activated carbon between the layer of tantalum carbide and the electrolyte;
   an insulating header in an open end of the case and electrically isolating the anode and the case;
   a riser extending through the header and attached to a first lead;
   a non-conductive gasket inside the case between the electrolyte and the header, the non-conductive gasket surrounding a portion of the anode not in contact with the electrolyte; and
   a second lead of opposite polarity from the first lead, the second lead being attached to the case.

2. The capacitor of claim 1 wherein the electrolyte is a liquid electrolyte.

3. The capacitor of claim 1 wherein the electrolyte is a gel electrolyte.

4. The capacitor of claim 1 wherein the gasket has a elastomer seal on the periphery of the gasket.

5. A capacitor comprising:
   an anode;
   a dielectric layer on the anode;
   an electrolyte adjacent to the dielectric layer;
   a metal case surrounding the anode;
   an interface carbide layer on an inner surface of the case formed by heating graphite in contact with the case to an elevated temperature in the substantial absence of oxygen; and
   a layer of activated carbon on the side of the interface layer away from the case, the activated carbon being in contact with the electrolyte.

6. The capacitor of claim 5 wherein the electrolyte is a liquid electrolyte.

7. The capacitor of claim 5 wherein the electrolyte is a gel electrolyte.

8. The capacitor of claim 5 wherein the elevated temperature is in the range of from about 1,000° C. to about 1,500° C.

9. The capacitor of claim 5 further comprising a cup-shaped cylindrical case having two ends, and an open end being closed by a header with the anode projecting through the header.

* * * * *